(12) United States Patent
Saiki et al.

(10) Patent No.: US 6,183,892 B1
(45) Date of Patent: Feb. 6, 2001

(54) MAGNETIC RECORDING MEDIUM SUBSTRATE AND MAGNETIC RECORDING MEDIUM

(75) Inventors: Jun Saiki; Hideo Okada; Yukihiro Miyamoto, all of Yokohama (JP)

(73) Assignee: Mitsubishi Chemical Corporation, Tokyo (JP)

(*) Notice: Under 35 U.S.C. 154(b), the term of this patent shall be extended for 0 days.

(21) Appl. No.: 09/154,731

(22) Filed: Sep. 17, 1998

(30) Foreign Application Priority Data

Sep. 19, 1997 (JP) ................................. 9-254805

(51) Int. Cl.$^7$ .................................................. G11B 5/60
(52) U.S. Cl. ........................... 428/694 ST; 428/694 SG; 428/694 TR; 428/694 BR; 428/433
(58) Field of Search ................... 428/694 SG, 694 ST, 428/694 TR, 694 BR, 433, 900

(56) References Cited

U.S. PATENT DOCUMENTS

| | | | |
|---|---|---|---|
| 5,626,935 | * 5/1997 | Naoyuki | 428/64.1 |
| 5,626,941 | * 5/1997 | Ouano | 428/141 |
| 5,726,108 | * 3/1998 | Taguchi | 501/5 |
| 5,744,208 | * 4/1998 | Beall | 428/64.1 |
| 5,780,371 | * 7/1998 | Rifqi | 501/67 |
| 5,875,084 | * 2/1999 | Baumgart | 360/135 |

* cited by examiner

Primary Examiner—Leszek Kiliman
(74) Attorney, Agent, or Firm—Oblon, Spivak, McClelland, Maier & Neustadt, P.C.

(57) ABSTRACT

A magnetic recording medium substrate comprising glass, wherein the substrate uniformly recess minute grooves having a length and a width in the range of from 0.001 to 1 μm on the whole surface and an area percentage of grooves having a length or a width exceeding 1 μm is at most 0.5% of the glass substrate.

24 Claims, 2 Drawing Sheets

1.190e+01

1.190e+01

MAGNETIC RECORDING MEDIUM SUBSTRATE AND MAGNETIC RECORDING MEDIUM

BACKGROUND OF THE INVENTION

1. Field of the Invention

The present invention relates to a substrate for a magnetic recording medium and a magnetic recording medium using the substrate. Particularly, the present invention relates to a substrate for a high recording density magnetic recording medium such as a fixed type thin film magnetic recording disk used for information industries.

2. Discussion of Background

Recently, a fixed magnetic disk device is widely used as an outer recording device for an information processing device such as a computer. A magnetic disk in the fixed magnetic disk device is prepared generally by forming a NiP layer on the surface of a magneticless substrate comprising an aluminum alloy, applying a smoothing treatment, a texturing treatment or the like thereon, and then forming a magneticless metal underlayer, a magnetic layer, a protective layer, a lubricant layer and the like in order thereon.

In the magnetic disk device, a recording-reproducing head moves at a predetermined flying height on a magnetic recording medium, but recently the flying height became smaller and smaller in proportion to a rapid increase in a surface recording density of a magnetic recording medium. Further, a magnetic disk device tends to be miniaturized and lightened rapidly, and it is necessary to make a surface roughness of a magnetic recording medium much smaller in order to be applicable to this tendency, and actually the medium surface roughness Ra is reduced to a level of a few angstrom (Å).

Also, in order to be applicable to a portable type fixed magnetic disk device, a shock resistance of a magnetic disk is required to be such a high value as 400G to 800G, and therefore a conventional substrate comprising an aluminum alloy tends to become unsatisfactory in shock resistance.

Consequently, in view of shock resistance and surface smoothness, a glass substrate capable of providing a very small surface roughness and excellent in mechanical strength tends to be used in place of an aluminum alloy substrate.

In case of an aluminum alloy substrate having a NiP layer formed, concentric texturing is applied on the surface toward the periphery of the substrate by grinding in most cases. This object is mainly to make an abrasive property between a recording-reproducing head and a magnetic recording medium satisfactory and to secure a satisfactory durability.

Also, recently, since a flying height of a head during operation of a magnetic disk device is remarkably small, texturing by laser beam is applied to CSS zone only in place of texturing by grinding. Thus, formation of protrusions by laser beam is tried. (see JP-A-8-129749).

However, since a glass substrate is generally transparent and is poor in absorptivity of laser and is hardly meltable, it is difficult to uniformly form protrusions of a specific shape as compared with a case of irradiating a NiP layer with laser beam.

Further, it is not easy to apply mechanical texturing to a hard glass substrate, and it is difficult to carry out uniform texturing in a case of glass ceramics since a crystallizing part and an amorphous part are different from each other in hardness.

Therefore, in order to apply laser texturing technique to a glass substrate, it is preferable to previously form a NiP layer on the substrate. For example, it is proposed in JP-A-61-54018 that NiP is formed on a glass substrate by electroless plating.

However, heretofore, there was a problem that adhesion between glass and NiP was poor. Therefore, in order to improve the adhesion between a glass substrate and a NiP electroless-plated layer, there has been proposed a method for mechanically or chemically roughening the surface of a glass substrate or a method for carrying out pretreatment of electroless plating.

However, smoothness and adhesion between a glass substrate and a NiP layer have been still unsatisfactory even by carrying out any of these method.

The present invention has been made in order to solve these problems, and its object is to provide a magnetic recording substrate comprising glass having a excellent adhesion to a NiP layer, and also to provide a magnetic recording medium having a high shock resistance and a satisfactory surface smoothness and stably achieving a low flying height of a head.

SUMMARY OF THE INVENTION

The present inventors have diligently studied to solve the above problems and discovered that an excellent NiP layer satisfying the above mentioned various requirements can be formed on a substrate by using a glass substrate having minute grooves of a specific shape on the surface, and the present invention is completed on the basis of this discovery.

That is, the first feature of the present invention resides in a magnetic recording medium substrate comprising glass, wherein the substrate uniformly has minute grooves having a length and a width in the range of from 0.001 to 1 $\mu$m on the whole surface and an area percentage of grooves having a length or a width exceeding 1 $\mu$m is at most 0.5% of the glass substrate.

The second feature of the present invention resides in a magnetic recording medium substrate having substrate having a NiP layer provided on a glass substrate uniformly having minute grooves having a length and a width in the range of from 0.001 to 1 $\mu$m on the whole surface wherein an area percentage of grooves having a length or a width exceeding 1 $\mu$m is at most 0.5% of the glass substrate.

The third feature of the present invention resides in a magnetic recording medium which comprises a glass substrate uniformly having minute grooves having a length and a width in the range of from 0.001 to 1 $\mu$m on the whole surface wherein an area percentage of grooves having a length or a width exceeding 1 $\mu$m is at most 0.5% of the glass substrate, and having a NiP layer, an underlayer, a magnetic layer and a protective layer provided thereon in order.

The fourth feature of the present invention resides in a magnetic recording medium substrate comprising glass, wherein the substrate uniformly has minute grooves having a length and a width in the range of from 0.001 to 1 $\mu$m on the whole surface and grooves having a length or a width exceeding 1 $\mu$m are present only in an amount of at most 30 pieces/10000 $\mu m^2$ on the glass substrate.

The fifth feature of the present invention resides in a magnetic recording medium substrate having a NiP layer provided on a glass substrate uniformly having minute grooves having a length and a width in the range of from 0.001 to 1 $\mu$m on the whole surface wherein grooves having a length or a width exceeding 1 $\mu$m are present only in an amount of at most 30 pieces/10000 82 $m^2$ on the glass substrate.

The sixth feature of the present invention resides in a magnetic recording medium which comprises a glass substrate uniformly having minute grooves having a length and a width in the range of from 0.001 to 1 µm on the whole surface wherein grooves having a length or a width exceeding 1 µm are present only in an amount of at most 30 pieces/10000 µm² on the glass substrate, and having a NiP layer, an underlayer, a magnetic layer and a protective layer provided thereon in order.

The seventh feature of the present invention resides in a magnetic recording medium substrate comprising glass, wherein the substrate uniformly has minute grooves having a length and a width in the range of from 0.001 to 1 µm and grooves having a length or a width exceeding 1 µm are present only at an area percentage of at most 0.5% and in an amount of at most 30 pieces/10000 µm² on the glass substrate.

The eighth feature of the present invention resides in a magnetic recording medium which comprises a glass substrate uniformly having minute grooves having a length and a width in the range of from 0.001 to 1 µm on the whole surface wherein grooves having a length or a width exceeding 1 µm are present only at an area percentage of at most 0.5% and in an amount of at most 30 pieces/10000 µm² on the glass substrate, and having a NiP layer provided thereon.

The ninth feature of the present invention resides in a magnetic recording medium which comprises a glass substrate uniformly having minute grooves having a length and a width in the range of from 0.001 to 1 µm on the whole surface wherein grooves having a length or a width exceeding 1 µm are present only at an area percentage of at most 0.5% and in an amount of at most 30 pieces/10000 µm² on the glass substrate, and having a NiP layer, an underlayer, a magnetic layer and a protective layer provided thereon in order.

DETAILED DESCRIPTION OF THE INVENTION

Hereinafter, the present invention is described in more details.

The glass substrate of the present invention uniformly has minute grooves having a length and a width in the range of from 0.001 to 1 µm on the whole surface and an area percentage of grooves having a length or a width exceeding 1 µm is at most 0.5% of the glass substrate. Also, the glass substrate of the present invention uniformly has minute grooves having a length and a width in the range of from 0.001 to 1 µm on the whole surface and grooves having a length or a width exceeding 1 µm are present only in an amount of at most 30 pieces/10000 µm² on the glass substrate.

Figure 1:
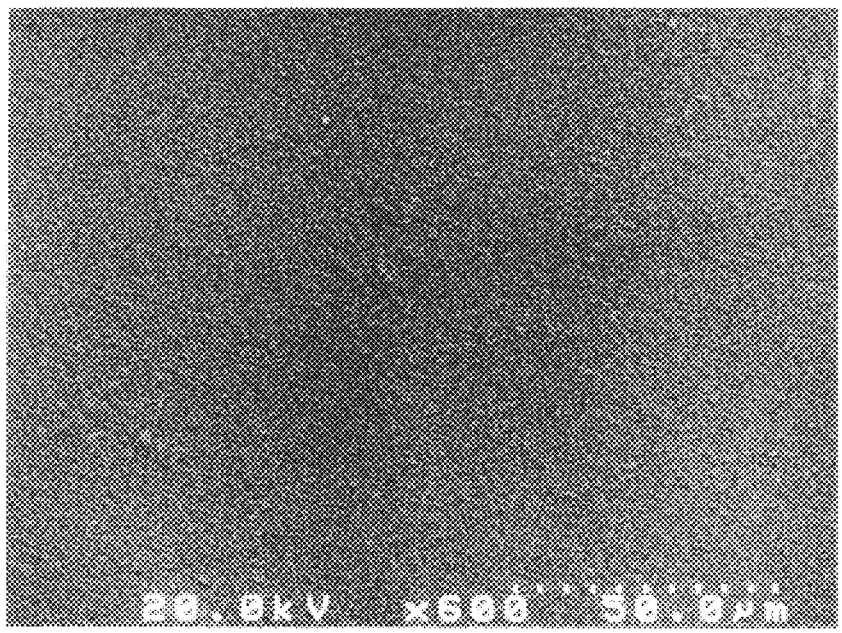
FIG. 1 is a photograph of a scanning electron microscope (SEM) having a magnifying power of 600 times with regard to Example of the present invention.
Figure 2:
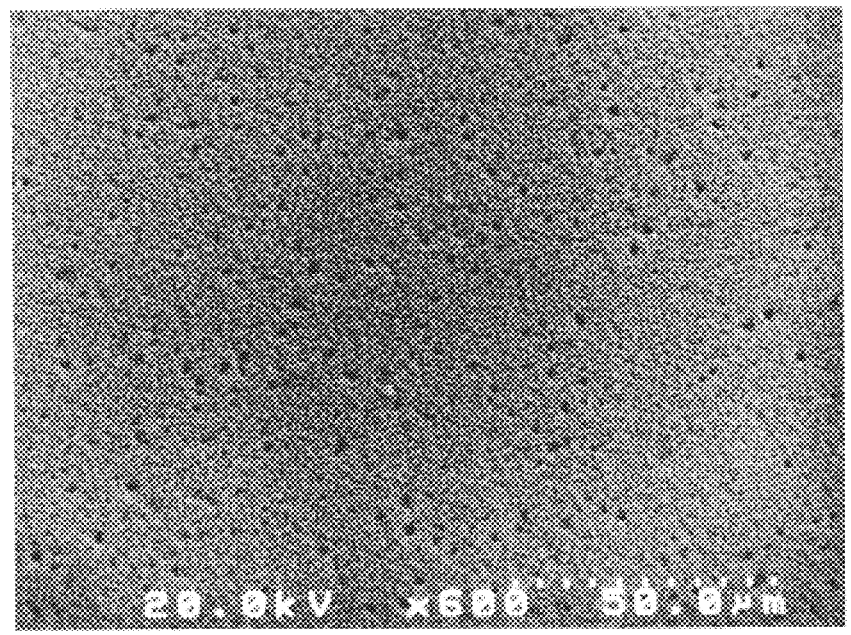
FIG. 2 is a photograph of a scanning electron microscope (SEM) having a magnifying power of 600 times with regard to Comparative Example of the present invention.

The grooves on the substrate surface can be observed as black parts in the secondary electron images of scanning electron microscope (SEM) as shown in FIGS. 1 and 2. A length and a width of the grooves can be measured from images of the substrate surface observed at an angle of 40° inclined to a secondary electron beam detector by using SEM.

The grooves having a length or a width exceeding 1 µm are observed and measured with regard to images of 600 time magnification, and the minute grooves having a length and a width in the range from 0.001 to 1 µm are observed and measured with regard to images of 6,000 time magnification.

A length of a groove indicates a longest straight line part of a groove, and a width of a groove indicates a longest straight line part in the vertical direction of the length.

The present inventors have studied and found that it is most effective for improving adhesion between a glass substrate and a NiP layer to raise a mechanical anchoring effect, and thus this effect is greatly raised by providing the above mentioned structure.

Its mechanism is not clear, but it is considered that when chemical etching is applied to a glass substrate under mild conditions, minute grooves and lands are uniformly formed, or melted glass and its fluorides precipitate on the recidivate of the substrate to form minute lands, and they are combined to uniformly form minute grooves on the whole surface, which contribute to improvement on the adhesion as a whole.

On the contrary, under hard etching conditions employing a high concentration etching solution, a high liquid temperature and a long treating time, etching rapidly proceeds at a specific part, and non-uniform grooves and lands having various sizes or grooves having a very large size are liable to be formed.

When forming a NiP layer, the NiP layer is formed also within minute grooves, and therefore an effect for strengthening adhesion between the glass substrate and the NiP layer, i.e. a strong mechanical anchoring effect, is considered to be achieved.

For example, according to electroless plating method, Sn is first invaded into grooves by sensitizing treatment, and Pd is further invaded therein by reducing action of activating treatment, and accordingly a NiP layer is formed also within the grooves during NiP plating treatment.

This mechanical anchoring effect becomes very large particularly when grooves having a length and a width in the range of from 0.001 to 1 µm, preferably from 0.01 to 0.5 µm, more preferably from 0.03 to 0.5 µm, are uniformly formed.

A shape of these uniform grooves is not specially limited, and grooves having a circular, elliptical or rectangular shape or a combination of these shapes may be used.

In order to raise the mechanical anchoring effect, grooves having the inside broader than the approach or grooves formed not vertically but obliquely on a glass surface are preferable. A depth of the grooves is generally in the range of from 0.001 to 5 µm, preferably from 0.01 to 1 µm.

When the length or the width of grooves is less than 0.001 µm, a NiP film formed therein becomes too minute and poor in strength and does not achieve a satisfactory mechanical anchoring effect.

On the contrary, when the length or the width of grooves exceeds 1 µm, such grooves are not in gear and do not provide a satisfactory mechanical anchoring effect. Also, since a part of low adhesion is formed in a broad zone, and separation tends to occur from this zone.

Therefore, in the present invention, an area percentage of grooves having a length or a width exceeding 1 µm should be at most 0.5% on a glass substrate, or such grooves should be present only in an amount of at most 30 pieces/10000 $\mu m^2$. Preferably, grooves having a length or a width exceeding 1 $\mu m$ should be present only at an area percentage of at most 0.5% and in an amount of at most 30 pieces/10000 $\mu m^2$ on the glass substrate.

More preferably, grooves having a length or a width exceeding 1 $\mu m$ should be present only at an area percentage of at most 0.2% or in an amount of at most 10 pieces/10000 $\mu m^2$, most preferably only at an area percentage of at most 0.1% or in an amount of at most 5 pieces/10000 $\mu m^2$.

Generally, grooves are formed on a glass substrate by a mechanical method or a chemical treatment such as etching or a chemical method such as surface-modification.

In the chemical etching, an etching solution such as hydrofluoric acid, hydrofluoric acid/potassium fluoride, hydrofluoric acid/ammonium fluoride or the like is usually used generally at a liquid temperature of from room temperature to 80° C. for an etching time of from 10 seconds to 30 minutes.

As in the present invention, a glass substrate having minute grooves uniformly formed without forming grooves having a large size exceeding 1 $\mu m$ can be prepared by appropriately combining a kind of a glass substrate and etching conditions including a kind of etching solution, a concentration, a liquid temperature and a treating time, but the aimed glass substrate can be more easily prepared by employing relatively mild conditions, i.e. using a glass having a certain degree of crystallinity which is not etched too much, selecting an etching solution having a mild action, using a lower concentration, using a lower liquid temperature and using a shorter etching time.

For example, an etching solution having a weak acidity such as hydrofluoric acid/ammonium fluoride is desirable, or an etching solution having a strong acidity such as hydrofluoric acid, hydrofluoric acid/potassium fluoride or the like is used in combination with appropriately selected other conditions.

Also, a concentration of an etching solution is preferably from 20 to 50 g/l.

Examples of a glass substrate include generally soda lime silicate glass, alkali-containing borate glass, alkali-free glass, borosilicate glass, aluminosilicate glass, quartz glass, lead glass, zinc glass, chemically strengthened glass, glass ceramics, and the like, and among them, glass ceramics is most preferable.

When glass ceramics is sued as a glass substrate, it is considered that an amorphous zone is selectively etched and a crystalline zone remains on the substrate surface, thus appropriately forming minute grooves without impairing smoothness of the surface.

A crystallinity of glass ceramics is usually from 30 to 90%. When the crystallinity is low, minute grooves are hardly formed by uniform etching and adhesion tends to become poor. When the crystallinity is too high, etching becomes hard.

A preferable crystal size is from 0.05 to 0.5 $\mu m$. a glass substrate to be used may be subjected to polishing treatment to provide mirror finish or may not be subjected to polishing treatment.

Examples of glass ceramics include generally alkali-free glass and alkali glass such as $SiO_2$—$Li_2O$, $SiO_2$—$Li_2O$—$Al_2O_3$, $SiO_2$—$MgO$—$Al_2O_3$, $SiO_2$—$Li_2O$—$MgO$—$Al_2O_3$, $SiO_2$—$Na_2O$—$Al_2O_3$, $SiO_2$—$K_2O$—$Al_2O_3$ and $SiO_2$—$BaO$—$Al_2O_3$.

The glass substrate thus prepared is coated with an NiP layer as mentioned below. The NiP layer is formed by electroless plating or spattering, but in the present invention, in order to provide an NiP layer within minute grooves, it is preferable to employ electroless plating. If necessary, Cu or other metals may be incorporated into the NiP layer.

The electroless plating process comprises a sensitizing step, an activating step and a NiP electroless plating step of a glass substrate. Usually, before the sensitizing step, a degreasing step is provided. Also, a washing step with water is provided between corresponding steps, and ion-exchanged water or ultrapure water is used appropriately as a washing water.

The degreasing step is a step for washing the surface of a glass substrate, and employs, for example, ultrapure water, an alkali-washing agent, an acid-washing agent, a surfactant or the like.

The sensitizing step and the activating step are steps for providing catalytic activities necessary for initiating NiP electroless plating on a glass substrate. That is, since a glass surface does not have a catalytic activity, it is necessary for initiating electroless plating to form a catalyst nucleus of a noble metal such as Au, Pt, Pd, Ag or the like on the surface of glass.

The above respective steps are generally carried out in the following manner.

In the sensitizing step, a divalent metal ion such as Sn, Ti Pd, Hg or the like is adsorbed. Generally, a tin chloride aqueous solution having a concentration of about 0.05 g/l is preferably used, and a glass substrate is dipped in the tin chloride aqueous solution at normal temperature for 1 to 3 minutes.

Further, in the activating step, the above treated glass substrate is dipped in an activating treatment solution containing a noble metal forming the above mentioned catalyst nucleus, and a catalyst nucleus is formed on the surface of the glass substrate by reducing action of the above adsorbed divalent metal ion. Usually, a palladium chloride aqueous solution having a concentration of about 0.05 g/l is preferably used, and the substrate is dipped in the palladium chloride aqueous solution at normal temperature for about 1 to 3 minutes.

The glass substrate thus treated in the activating step is subjected to NiP electroless plating step by usual method. Generally, a commercially available NiP electroless plating bath is used, and the glass substrate is treated in the plating bath for a predetermined time so as to provide a desired NiP film thickness.

The thickness of the NiP layer is preferably at least 1 $\mu m$, more preferably at least 2 $\mu m$, most preferably at least 5 $\mu m$, so as to provide a satisfactory smoothness and to improve a magnetic property of a medium. However, if this thickness is too large, adhesion to a glass substrate becomes poor and therefore this thickness should be preferably at most 15 $\mu m$, more preferably at most 12 $\mu m$.

The glass substrate having the NiP layer thus formed is subjected to polishing treatment if necessary, and is then subjected to texturing with laser beam or mechanical texturing in the same manner as in a conventional aluminum alloy substrate having a NiP layer formed.

Thus, a texturing device conventionally used can be used as it is, and this is very advantageous in view of a production line and a production cost.

Heretofore, various methods for roughening a glass surface have been proposed, but according to these conventional methods, it has been impossible to form a NiP layer having a satisfactory adhesion and smoothness on a glass substrate, which is necessary for producing a satisfactory magnetic disk.

For example, JP-A-2-217336 proposes a method which comprises polishing a $SiO_2$—$Li_2O$—$Al_2O_3$ system glass ceramics substrate and then etching to provide Ra=50–2000 Å as a texturing treatment of a glass substrate.

JP-A-3-160619 proposes a method which comprises etching a glass ceramics substrate to provide Ra=at most 150 Å as a texturing treatment of a glass substrate.

JP-A-7-296380 proposes a method which comprises polishing a $SiO_2$—$Li_2O$—$Al_2O_3$ system glass ceramics substrate and then etching to provide Ra=50–150 Å as a texturing treatment of a glass substrate.

However, all of these methods are proposed to improve only Ra, i.e. a depth of grooves and lands, and a length and a width of grooves are not taken into consideration at all, and these methods disclose nothing about disadvantages caused due to the presence of too large grooves.

Probably, a depth of grooves and lands only is taken into consideration for the purpose of texturing in these methods, and it is considered that a surface shape produced in these methods is different from the aimed surface shape of the present invention for improving adhesion to a NiP layer.

Also, JP-A-7-334841 proposes a method which comprises roughening the surface of a glass substrate by etching, removing an alien substance on the surface, adjusting the surface and then forming a NiP electroless plating layer thereon.

However, this method employs an etching solution having a high acidity at a high concentration and also employs a high treating temperature for a longer time, thus employing considerably hard etching conditions as a whole. Under such strong etching conditions, etching of a specific part is liable to rapidly proceed, and non-uniform grooves and lands having various sizes or very large grooves are formed, as in Comparative Example of the present invention.

The present invention provides a magnetic recording medium substrate comprising glass, which has minute grooves only uniformly formed on the whole surface by prohibiting formation of such large grooves and which is excellent in adhesion to a NiP layer.

The substrate thus prepared in the present invention is provided with an underlayer, a magnetic layer, a protective layer and the like to provide a magnetic recording medium. Usually, a Cr type or Al type underlayer such as NiAl, a magnetic layer, a protective layer and a lubricant layer are formed in order by lamination.

A film thickness of the underlayer is selected so as to match with a desired magnetic property, and is usually from 100 to 1,000 Å. The underlayer is usually formed with pure Cr, but may contain other elements up to about 20 atm % in total. Automatically, an Al type alloy such as NiAl may be used. The underlayer is usually a mono-layer, but may be a multi-layer film comprising a plurality of layers.

Usually, the magnetic layer is preferably a Co type alloy magnetic layer such as Co—Cr, Co—Ni, Co—Cr—X, Co—Ni—X, Co—W—X or the like, wherein X is at least one or two or more elements selected from the group consisting of Li, Si, Ca, Ti, V, Cr, Ni, As, Y, Zr, Nb, Mo, Ru, Rh Ag, Sb, Hf, Ta, W, Re, Os, Ir, Pt, Au, La, Ce, Pr, Nd, Pm, Sm and Eu.

Preferable examples include CoNiCr, CoCr, CoCrTa, CoCrPt, CoCrPtTa, CoCrPtB, CoNiPt, CoNiCrBTa, CoSm and the like.

A film thickness of the magnetic layer is usually from 100 to 500 Å. The magnetic layer may be a mono-layer or a multi-layer.

Also, if necessary, an intermediate layer may be provided between the magnetic layer and the underlayer.

The protective layer is prepared from a carbon film, a carbon hydride film, a carbon nitride film, a carbide film such as TiC and SiC, a nitride film such as SiN and TiN, an oxide film such as SiO, $Al_2O_3$ and ZrO, and the like, but among them, preferable examples include a carbon film, a carbon hydride film and a carbon nitride film, and the protective layer is formed by vapor deposition method, CVD method, sputtering method, ion plating method, wet type method or the like.

For example, the carbon hydride film may be any film containing hydrogen and carbon, and is not particularly limited, and is formed by sputtering using carbon as a target in a plasma containing rare gas and hydrogen gas. Examples of the target used include diamond-like, graphite-like or amorphous-like carbon.

Also, examples of the rare gas include argon, helium, neon, xenon, radon, krypton and the like, but among them, argon is preferably used to a hydrogen gas content in the sputtering atmosphere containing hydrogen gas and rare gas such as argon gas is usually in a range of from 2 to 20 vol %, preferably from 5 to 10 vol %.

As the sputtering method, direct current magnetron sputtering method is usually used, but high-frequency magnetron sputtering method can also be used. A pressure in a chamber during sputtering is usually from 0.5 to 20 mTorr, preferably from 1 to 10 mTorr, and a substrate temperature is usually at most 300° C., preferably in the range of from normal temperature to 250° C. A distance between a substrate and a target, a sputtering time, a charged electric power and the like are selected optionally depending on a film thickness of a carbon hydride protective layer to be formed.

The film thickness is usually from 30 to 500 Å, preferably from 30 to 200 Å. A protective layer may be either a mono-layer or a multi-layer.

Further, a thickness of a lubricant layer is preferably used in the range of from 15 to 50 Å. Also, after forming a lubricant layer, a heat treatment may be applied thereto. The heating temperature is at least 50° C., but is optionally selected in the range of a temperature lower than a decomposition temperature of a lubricant.

As a lubricant for forming a lubricant layer, a fluorine type liquid lubricant is preferable. Particularly, a compound having a fluorocarbon structure in a molecule structure and having a hydroxyl group at a terminal or side chain is preferable, examples of which include perfluorocarboxylate, perfluorothiolcarboxylate, perfluorodicarboxylate, perfluoroalkyl perfluorocarboxylate, perfluorobenzoate, perfluoroalkyl carboxylate, perfluoroalkyl dicarboxylate, perfluoroalkoxyalkyl carboxylate, perfluorocarboxylic acid amide, perfluoropolyether, perfluoropolyethercarboxylic acid, perfluoropolyether alcohol, perfluoropolyether ester, and the like.

Particular examples of such a lubricant include Fomblin-Z-DOL (tradename) and Fomblin-Z-Tetraol (tradename) manufactured by Ausimont Company, and the like.

An underlayer, a magnetic layer and a protective layer are formed by such a usual method as direct current sputtering method, high-frequency sputtering method, vacuum deposition method, and the like.

A protective layer and a lubricant layer are not essential components for a magnetic recording medium, but in view of durability of a magnetic recording medium and abrasive property to a recording-reproducing head, it is quite desirable to provide these layers on the medium.

As mentioned above, a magnetic recording medium excellent in shock resistance and having such a strong adhesion as not to cause separation between a glass substrate and a NiP layer can be obtained.

Alternatively, an opto-magnetic recording medium having an opto-magnetic recording layer in place of a magnetic layer can also be obtained. Examples of the opto-magnetic recording layer include an amorphous magnetic layer comprising a rare earth metal and a transition metal such as TbFe, TbFeCo, TbCo, GdFeCo, DyTbFeCo or the like, a polycrystal vertical magnetic layer such as MnBi, MnCuBi or the like, a Pt/Co multi-layer film, and the like.

The opto-magnetic recording layer may be a mono-layer, or may be a multi-layer comprising at least 2 magnetic lamination layers such as GdTbFe/TbFe to enable overwriting or MSR. In the case of the opto-magnetic recording medium, an underlayer is generally not necessary.

EXAMPLES

Hereinafter, the present invention is further described in more details with reference to Examples, but should not be limited to these Examples unless departing from the spirit of the present invention.

In each Example, measurement and evaluation were conducted under the following conditions.

(1) Evaluation of Glass Substrate Surface

By using a scanning electron microscope (SEM) having a magnification of 600 times, a glass substrate was observed at an angle of 40° inclined to a secondary electron beam detector, and by using an image processing device MINS (Mitsubishi Kagaku Image Processing Network System) manufactured by Mitsubishi Chemical Corportion, an average value of the total density as a threshold value was subjected to binary-coded image processing, thereby determining an area percentage (area percentage 1) and a presence proportion (presence proportion 1) of grooves having a length or a width exceeding 1 $\mu$m on the substrate surface. The detection limit was 0.24 $\mu$m.

Thereafter, by using a scanning electron microscope (SEM) having a magnification of 6,000 times, a glass substrate inclined at an angle of 40° to a secondary electron beam detector was observed, and by using an image processing device MINS (Mitsubishi Kagaku Image Processing Network System) manufactured by Mitsubishi Chemical Corporation, an average value of the total density as a threshold value was subjected to binary-coded image processing, thereby determining an area percentage (area percentage 2) and a presence proportion (present proportion 2) of grooves having a length and a width in the range of from 0.001 to 1 $\mu$m. The detection limit was 0.024 $\mu$m.

(2) Evaluation of Adhesion Between Glass Substrate and NiP Layer

Adhesion was evaluated at five points per each glass substrate in accordance with cross cut test of JIS K 5400 6. 15. Peeling test was repeated three times at each point, and evaluation was made by counting the number of cross cuts remained without peeling. Evaluation mark 10 indicates the most satisfactory adhesion.

Example 1

Commercially available glass ceramics was subjected to grinding treatment using fixed abrasive grains, and was then subjected to lapping treatment using an abrasive agent ("artificial abrasive agent FO" (composite artificial emery) manufactured by Fuji Incorporated, specific gravity: at least 3.90, $Al_2O_3$: at least 45 wt %, TiO: at most 2.0 wt %, ZrSiO: at most 49 wt %, particle size classification #1000: maximum particle size of at most 27 $\mu$m).

The glass substrate thus treated was washed with an alkali cleaning agent for glass ("PK-LCG22" (tradename) manufactured by Parker Corporation) at a bath temperature of 50° C. for 10 minutes, and was washed with water, and was subjected to etching treatment by dipping in 50 g/l of acidic ammonium fluoride ($NH_4F \cdot HF$ manufactured by Kanto Kagaku K.K., JIS No. K8817) at room temperature for 8 minutes, and was finally washed with water.

A scanning electron microscope (SEM) photograph at a magnification of 600 times of this glass substrate surface is shown in FIG. 1. This was subjected to image processing, but grooves having a length or a width exceeding 1 $\mu$m was not detected.

Also, a SEM photograph at a magnification of 6,000 times of this glass substrate surface was subjected to image processing to measure the size, number and area of grooves. These measurement data are shown in Table 2 (magnification 6,000 times). An area percentage and a presence proportion of grooves determined from these results are shown in Table 1.

Further, the glass substrate having minute grooves was subjected to sensitizing treatment by dipping in 0.05 g/l of commercially available $SnCl_2$ aqueous solution at room temperature for 2 minutes and washing with water. Thereafter, it was subjected to activating treatment by dipping in 0.05 g/l of commercially available $PdCl_2$ aqueous solution at room temperature for 2 minutes and washing with water. Thereafter it was subjected to NiP electroless plating to form a NiP layer having a film thickness of 10.5 $\mu$m. Further, after plating, it was subjected to baking treatment at 150° C. for one hour in order to improve adhesion.

Adhesion between the NiP layer and the glass substrate thus obtained was evaluated, and the evaluation mark was 10, which proved a satisfactory adhesion (Table 1).

Comparative Example 1

Etching treatment was carried out in the same manner as in Example 1, except that a glass substrate was dipped in a mixed solution of 50 ml/l of hydrogen fluoride and 50 g/l of potassium hydrofluoride as an etching solution at a liquid temperature of 30° C. for 10 minutes.

Figure 3:
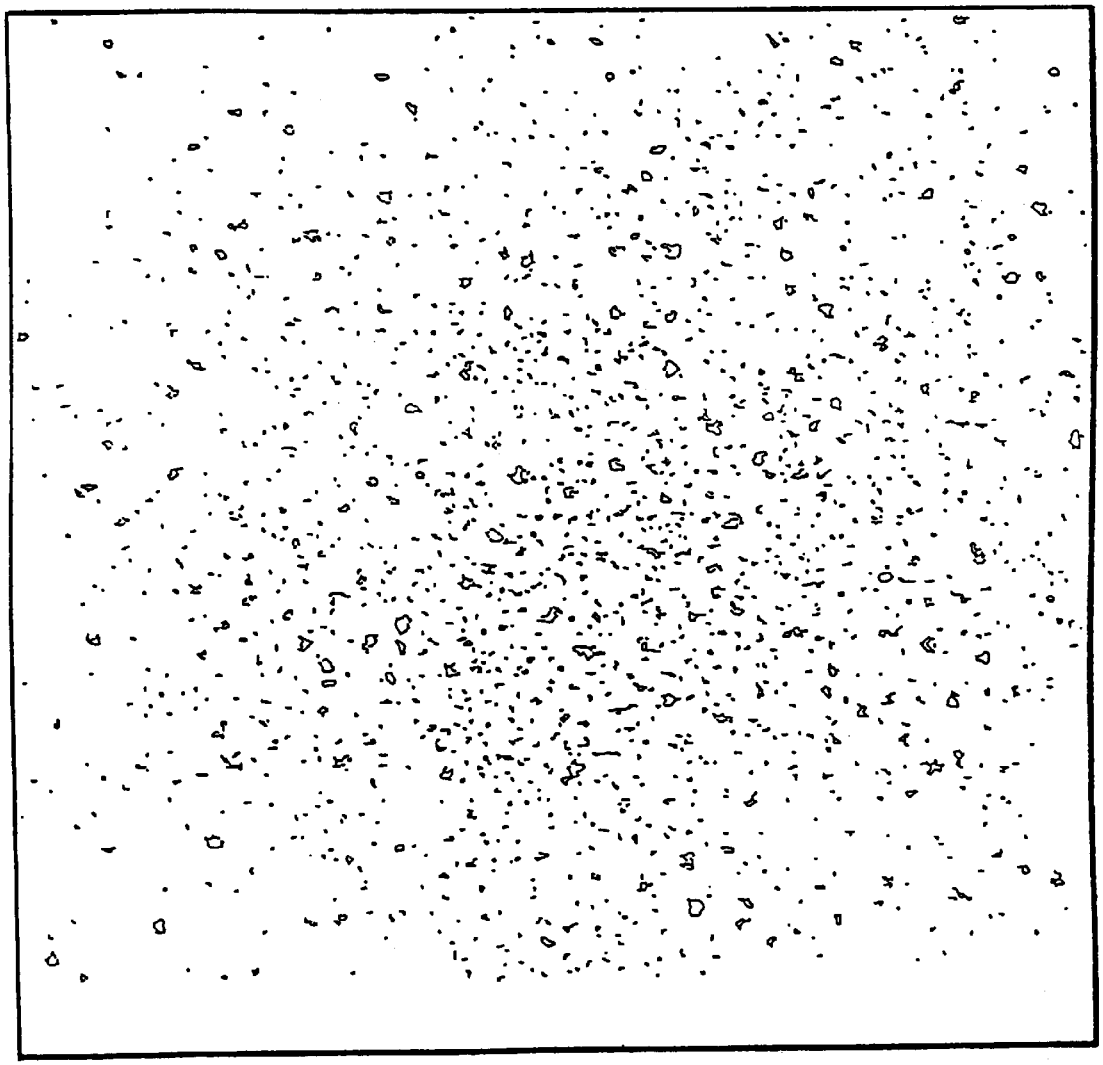
FIG. 3 shows an image after image-processing the photograph of FIG. 2.

A scanning electron microscope (SEM) photograph at a magnification of 600 times of the glass substrate surface is shown in FIG. 2, and an image obtained after subjecting this photograph to image processing is shown in FIG. 3.

On the basis of FIG. 3, the size, number and area of grooves were measured. The same measurement was made also with regard to a photograph taken at a magnification of 6,000 times.

The respective measurement data of grooves of the glass substrate surface are shown in Table 3 (magnification 600 times) and Table 4 (magnification 6,000 times). The respective area percentages and presence proportions calculated from these results are shown in Table 1.

Thereafter, NiP electroless plating was applied to this comparative substrate in the same manner as in Example 1 to form a NiP layer having a film thickness of 11.5 $\mu$m. after plating, baking treatment was carried out at 150° C. for 1 hour to improve adhesion.

The adhesion between NiP layer and glass substrate thus obtained was evaluated, and the evaluation mark was 1, which proved that the adhesion was unsatisfactory (Table 1).

TABLE 1

| | Area percentage 1 (%) | Presence proportion 1 pieces/ (100 μm)² | Area percentage 2 (%) | Presence proportion 2 pieces/ (100 μm)² | Evaluation mark (average value) |
|---|---|---|---|---|---|
| Example 1 | 0 | 0 | 0.66 | 1.0 × 10⁴ | 10 |
| Comparative Example 1 | 0.60 | 3.2 × 10¹ | 3.4 | 2.5 × 10⁴ | 1 |

TABLE 2

| Length (μm) | Number | Integrated value (%) |
|---|---|---|
| 0.:.5000E-02 | 98 | 67.59 |
| .5000E-02:.1000E-01 | 20 | 81.38 |
| .1000E-01:.1500E-01 | 13 | 90.84 |
| .1500E-01:.2000E-01 | 6 | 94.48 |
| .2000E-01:.2500E-01 | 2 | 95.86 |
| .2500E-01:.3000E-01 | 1 | 96.55 |
| .3000E-01:.3500E-01 | 2 | 97.93 |
| .3500E-01:.4000E-01 | 1 | 98.62 |
| .4000E-01:.4500E-01 | 0 | 98.62 |
| .4500E-01:.5000E-01 | 0 | 98.62 |
| .5000E-01:.5500E-01 | 0 | 98.62 |
| .5500E-01:.6000E-01 | 1 | 99.31 |
| .6000E-01:.6500E-01 | 0 | 99.31 |
| .6500E-01:.7000E-01 | 0 | 99.31 |
| .7000E-01:.7500E-01 | 0 | 99.31 |
| .7500E-01:.8000E-01 | 0 | 99.31 |
| .8000E-01:.8500E-01 | 1 | 100.00 |
| .8500E-01:.9000E-01 | 0 | 100.00 |
| .9000E-01:.9500E-01 | 0 | 100.00 |
| .9500E-01:.1000 | 0 | 100.00 |
| .1000:.1050 | 0 | 100.00 |
| .1050:.1100 | 0 | 100.00 |
| .1100:.1150 | 0 | 100.00 |
| .1150:.1200 | 0 | 100.00 |
| .1200:.1250 | 0 | 100.00 |
| .1250:.1300 | 0 | 100.00 |
| .1300:.1350 | 0 | 100.00 |
| .1350:.1400 | 0 | 100.00 |
| .1400:.1450 | 0 | 100.00 |
| .1450:.1500 | 0 | 100.00 |
| .1500:.1550 | 0 | 100.00 |
| .1550:.3600 | 0 | 100.00 |
| .1600:.1650 | 0 | 100.00 |
| .1650:.1700 | 0 | 100.00 |
| .1700:.1750 | 0 | 100.00 |
| .1750:.1800 | 0 | 100.00 |
| .1800:.1850 | 0 | 100.00 |
| .1850:.1900 | 0 | 100.00 |
| .1900:.1950 | 0 | 100.00 |
| .1950:.2000 | 0 | 100.00 |
| .2000:.2060 | 0 | 100.00 |
| .2050:.2100 | 0 | 100.00 |
| .2100:.2150 | 0 | 100.00 |
| .2150:.2200 | 0 | 100.00 |
| .2200:.2250 | 0 | 100.00 |
| .2250:.2300 | 0 | 100.00 |
| .2300:.2350 | 0 | 100.00 |
| .2350:.2400 | 0 | 100.00 |
| .2400:.2450 | 0 | 100.00 |
| .2450:.2500 | 0 | 100.00 |

TABLE 3

| Length (μm) | Number | Integrated value (%) |
|---|---|---|
| 0.:.5000E-01 | 0 | 0.00 |
| .5000E-01:.1000 | 879 | 51.92 |
| .1000:.1500 | 349 | 72.53 |
| .1500:.2000 | 145 | 81.16 |
| .2000:.2500 | 76 | 85.65 |
| .2500:.3000 | 44 | 88.25 |
| .3000:.3500 | 29 | 39.96 |
| .3600:.4000 | 16 | 90.90 |
| .4000:.4500 | 0 | 90.90 |
| .4500:.5000 | 16 | 91.85 |
| .5000:.5500 | 14 | 92.68 |
| .5500:.6000 | 17 | 93.58 |
| .6000:.6600 | 12 | 94.39 |
| .6500:.7000 | 13 | 95.15 |
| .7000:.7500 | 8 | 95.63 |
| .7500:.8000 | 9 | 96.16 |
| .8000:.8500 | 9 | 96.16 |
| .8500:.9000 | 9 | 96.69 |
| .9000:.9500 | 5 | 96.99 |
| .9500:1.000 | 5 | 97.28 |
| 1.000:1.050 | 5 | 97.58 |
| 1.060:1.100 | 2 | 97.70 |
| 1.100:1.150 | 2 | 97.81 |
| 1.150:1.200 | 5 | 98.11 |
| 1.200:1.250 | 2 | 98.23 |
| 1.250:1.300 | 0 | 98.23 |
| 1.300:1.350 | 7 | 98.64 |
| 1.350:1.400 | 1 | 98.70 |
| 1.400:1.450 | 4 | 98.94 |
| 1.450:1.500 | 2 | 99.05 |
| 1.500:1.660 | 0 | 99.05 |
| 1.550:1.600 | 5 | 99.35 |
| 1.600:1.650 | 0 | 99.35 |
| 1.650:1.700 | 0 | 99.35 |
| 1.700:1.750 | 0 | 99.35 |
| 1.750:1.800 | 3 | 99.53 |
| 1.800:1.850 | 2 | 99.65 |
| 1.850:1.900 | 0 | 99.65 |
| 1.900:1.950 | 1 | 99.70 |
| 1.950:2.000 | 0 | 99.70 |
| 2.000:2.050 | 0 | 99.70 |
| 2.050:2.100 | 0 | 99.70 |
| 2.100:2.150 | 0 | 99.70 |
| 2.150:2.200 | 1 | 99.76 |
| 2.200:2.250 | 2 | 99.88 |
| 2.250:2.300 | 0 | 99.88 |
| 2.300:2.350 | 1 | 99.94 |
| 2.350:2.400 | 1 | 100.00 |
| 2.400:2.450 | 0 | 100.00 |
| 2.450:2.500 | 0 | 100.00 |

TABLE 4

| Length (μm) | Number | Integrated value (%) |
|---|---|---|
| 0.:.5000E-02 | 195 | 54.78 |
| .5000E-02:.1000E-01 | 72 | 75.00 |
| .1000E-01:.1500E-01 | 31 | 83.71 |
| .1500E-01:.2000E-01 | 12 | 87.08 |
| .2000E-01:.2500E-01 | 3 | 89.33 |
| .2500E-01:.3000E-01 | 5 | 90.73 |
| .3000E-01:.3500E-01 | 4 | 91.85 |
| .3500E-01:.4000E-01 | 4 | 92.98 |
| .4000E-01:.4500E-01 | 3 | 93.82 |
| .4500E-01:.5000E-01 | 4 | 94.94 |
| .5000E-01:.5500E-01 | 4 | 96.07 |
| .5500E-01:.5000E-01 | 2 | 96.63 |
| .6000E-01:.6500E-01 | 0 | 96.63 |
| .6500E-01:.7000E-01 | 1 | 95.91 |
| .7000E-01:.7500E-01 | 1 | 97.19 |
| .7500E-01:.8000E-01 | 2 | 97.75 |
| .8000E-01:.8500E-01 | 1 | 98.03 |
| .8500E-01:.9000E-01 | 1 | 98.31 |
| .9000E-01:.9500E-01 | 1 | 98.60 |
| .9500E-01:.1000 | 0 | 98.60 |
| .1000:.1050 | 0 | 98.60 |

TABLE 4-continued

| Length (μm) | Number | Integrated value (%) |
|---|---|---|
| .1050:.1100 | 2 | 99.16 |
| .1100:.1150 | 0 | 99.16 |
| .1150:.1200 | 0 | 99.16 |
| .1200:.1250 | 0 | 99.16 |
| .1250:.1300 | 0 | 99.16 |
| .1300:.1350 | 0 | 99.16 |
| .1350:.1400 | 0 | 99.16 |
| .1400:.1450 | 0 | 99.16 |
| .1450:.1500 | 0 | 99.16 |
| .1500:.1550 | 1 | 99.44 |
| .1550:.1600 | 0 | 99.44 |
| .1600:.1650 | 0 | 99.44 |
| .1650:.1700 | 0 | 99.44 |
| .1700:.1750 | 0 | 99.44 |
| .1750:.1800 | 0 | 99.44 |
| .1800:.1850 | 0 | 99.44 |
| .1850:.1900 | 1 | 99.72 |
| .1900:.1950 | 0 | 99.72 |
| .1950:.2000 | 0 | 99.72 |
| .2000:.2050 | 0 | 99.72 |
| .2050:.2100 | 0 | 99.72 |
| .2100:.2150 | 0 | 99.72 |
| .2150:.2200 | 0 | 99.72 |
| .2200:.2250 | 0 | 99.72 |
| .2250:.2300 | 0 | 99.72 |
| .2300:.2350 | 0 | 99.72 |
| .2350:.2400 | 0 | 99.72 |
| .2400:.2450 | 0 | 99.72 |
| .2450:.2500 | 0 | 99.72 |

According to the present invention, a magnetic recording medium substrate comprising glass, which is excellent in adhesion to a NiP layer, can be obtained, and also a magnetic recording medium not only having a high shock resistance and a satisfactory surface smoothness but also stably having a low flying height of a head can be obtained.

What is claimed is:

1. A magnetic recording medium substrate comprising glass, wherein the substrate surface uniformly has minute grooves having a length and a width both in the range of from 0.001 to 1 μm on the whole surface and an area percentage of grooves having a length or width exceeding 1 μm is at most 0.5% of the surface of the glass substrate.

2. The magnetic recording medium substrate according to claim 1, wherein the substrate has an area percentage of grooves having a length or a width exceeding 1 μm is at most 0.2% of the surface of the glass substrate.

3. The magnetic recording medium substrate according to claim 1, wherein the glass is glass ceramics.

4. The magnetic recording medium substrate according to claim 3, wherein the glass is glass ceramics having a crystallinity of from 30 to 90%.

5. The magnetic recording medium substrate according to claim 1, wherein a NiP layer is provided on the glass substrate.

6. A magnetic recording medium which comprises a glass substrate uniformly having minute grooves having a length and a width both in the range of from 0.001 to 1 μm on the whole surface of said substrate wherein an area percentage of grooves having a length or a width exceeding 1 μm is at most 0.5% of the surface of the glass substrate, and having a NiP layer, an underlayer, a magnetic layer and a protective layer provided therein in order.

7. The magnetic recording medium according to claim 6, wherein the glass substrate on its surface has an area percentage of grooves having a length or a width exceeding 1 μm is at most 0.2% of the glass substrate.

8. The magnetic recording medium according to claim 6, wherein texturing is applied on the NiP layer.

9. A magnetic recording medium substrate comprising glass, wherein the substrate uniformly has minute grooves having a length and a width both in the range of from 0.001 to 1 μm on the whole surface and grooves having a length or a width exceeding 1 μm are present only in an amount of at most 30 pieces/10000 μm$^2$ on the surface of the glass substrate.

10. The magnetic recording medium substrate according to claim 9, wherein the substrate surface has grooves having a length or a width exceeding 1 μm are present only in an amount of at most 10 pieces/10000 μm$^2$ on the glass substrate.

11. The magnetic recording medium substrate according to claim 9, wherein the glass is glass ceramics.

12. The magnetic recording medium substrate according to claim 11, wherein the glass is glass ceramics having a crystallinity of from 30 to 90%.

13. The magnetic recording medium substrate according to claim 9, wherein a NiP layer is provided on the glass substrate.

14. A magnetic recording medium which comprises a glass substrate uniformly having minute grooves having a length and a width in the range of from 0.001 to 1 μm on the whole surface of said substrate wherein grooves having a length or a width exceeding 1 μm are present only in an amount of at most 30 pieces/10000 μm$^2$ on the surface of the glass substrate, and having a NiP layer, an underlayer, a magnetic layer and a protective layer provided thereon in order.

15. The magnetic recording medium according to claim 14, wherein the grooves having a length or a width exceeding 1 μm are present only in an amount of at most 10 pieces/10000 μm$^2$ are on the surface of the glass substrate.

16. The magnetic recording medium according to claim 14, wherein texturing is applied on the NiP layer.

17. A magnetic recording medium substrate comprising glass, wherein the substrate surface uniformly has minute grooves having both a length and a width in the range of form 0.001 to 1 μm and grooves having a length or a width exceeding 1 μm are present only at an area percentage of at most 0.5% and in an amount of at most 30 pieces/10000 μm$^2$ on the surface of the glass substrate.

18. The magnetic recording medium substrate according to claim 17, wherein grooves having a length or a width exceeding 1 μm are present only at an area percentage of at most 0.2% and in an amount of at most 10 pieces/10000 μm$^2$ on the surface of the glass substrate.

19. The magnetic recording medium according to claim 17, wherein the glass is glass ceramics.

20. The magnetic recording medium substrate according to claim 19, wherein the glass is glass ceramics having a crystallinity of from 30 to 90%.

21. The magnetic recording medium substrate according to claim 17, wherein a NiP layer is provided on the glass substrate.

22. A magnetic recording medium which comprises a glass substrate uniformly having minute grooves having both a length and a width in the range of from 0.001 to 1 μm on the whole surface wherein grooves having a length or a width exceeding 1 μm are present only at an area percentage of at most 0.5% and in an amount of at most 30 pieces/10000 μm$^2$ on the surface of the glass substrate, and having a NiP layer, an underlayer, a magnetic layer and a protective layer provided thereon in order.

23. The magnetic recording medium according to claim 22, wherein the glass substrate has grooves having a length or a width exceeding 1 μm only at an area percentage of at most 0.2% and in an amount of at most 10 pieces/10000 μm$^2$ on the surface of the glass substrate.

24. The magnetic recording medium according to claim 22, wherein texturing is applied on the NiP layer.

* * * * *